United States Patent [19]
Whitener

[11] 3,807,668
[45] Apr. 30, 1974

[54] ANTI-ROLL HYDRAULIC ANALOG DAMPING DEVICE

[75] Inventor: Philip C. Whitener, Seattle, Wash.

[73] Assignee: The United States of America as represented by the Administrator of the Federal Aviation Administration, Washington, D.C.

[22] Filed: Feb. 4, 1971

[21] Appl. No.: 112,649

[52] U.S. Cl........... 244/104 R, 188/129, 244/102 R
[51] Int. Cl............................................. B64c 25/58
[58] Field of Search .. 188/67, 129; 244/104, 103 R, 244/102 R, 102 A, 103 R, 100 R, 104 R

[56] References Cited
UNITED STATES PATENTS
2,393,493  1/1946  Brown............................ 244/104 R
2,928,507  3/1960  Thompson...................... 188/129 X
3,327,974  6/1967  Nicholl.......................... 244/102 R X Primary Examiner—Milton Buchler
Assistant Examiner—Paul E. Sauberer

[57] ABSTRACT

A hydraulic analog damping device is mounted in connection with an expander tube disposed between the inner and outer telescopic cylinders of an aircraft landing gear strut. The device will generate a frictional braking force between the two telescopic cylinders of the strut which is proportional to the velocity of the vertical translation of the strut.

10 Claims, 6 Drawing Figures

PATENTED APR 30 1974 3,807,668

INVENTOR,
PHILIP C. WHITENER
BY

AGENT

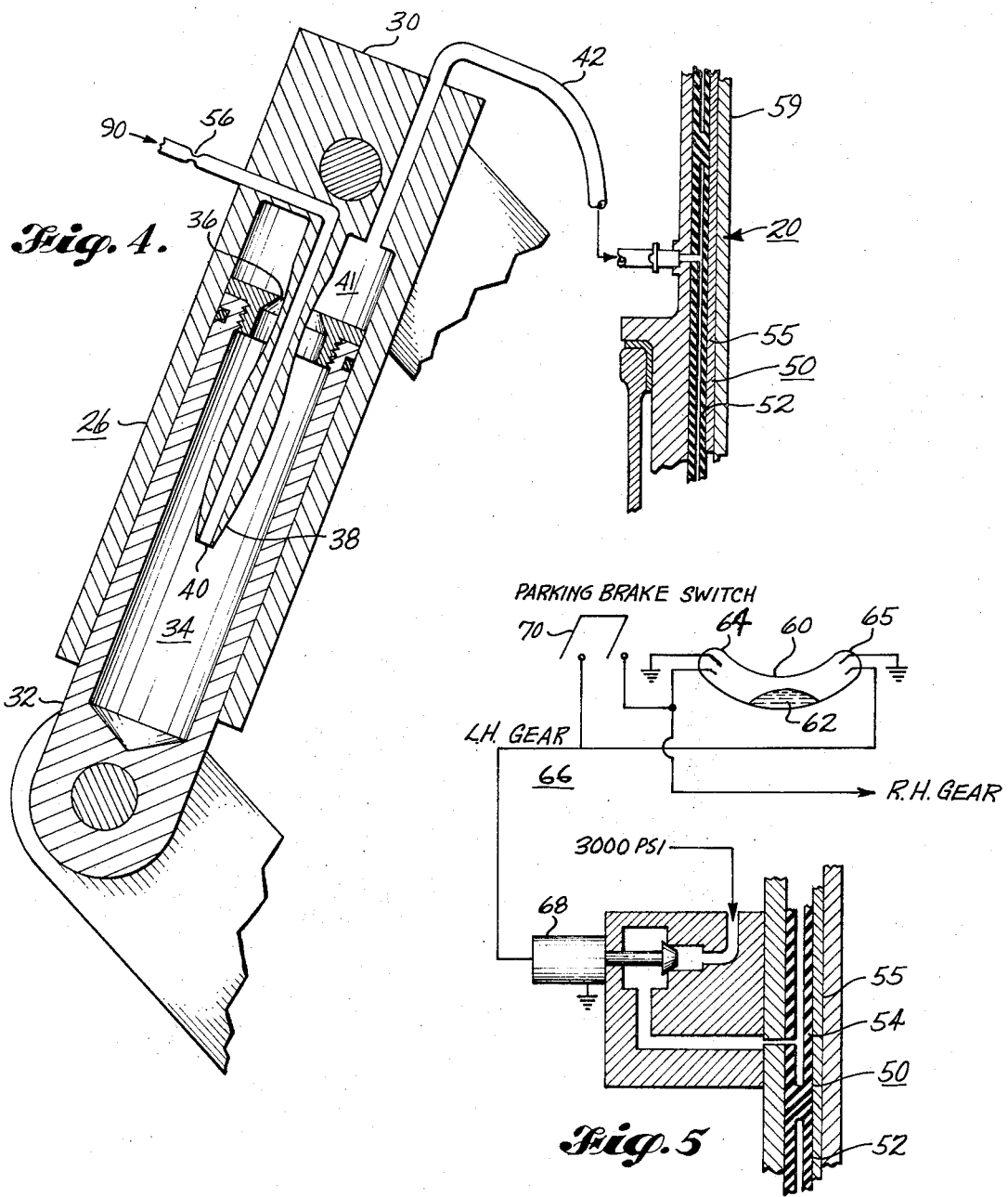

3,807,668

ANTI-ROLL HYDRAULIC ANALOG DAMPING DEVICE

BACKGROUND OF THE INVENTION

1. Field of the Invention

This invention relates to landing gears and more particularly to improved shock absorbing struts for aircraft landing gears.

2. Prior Art

The concept of employing an expander tube surrounding the inner cylinder of an oleo strut for retarding the movement thereof upon command of an analog damping device as set forth hereinafter was not noted in the prior art.

SUMMARY OF THE INVENTION

This invention relates to a hydraulic analog damping device and an associated anti-roll system. The hydraulic damping device comprises an expander tube encircling the inner cylinder of an oleo strut. The expander tube communicates with a fluid pressure source and is separated from the inner cylinder of the oleo strut by a friction band. Upon application of fluid pressure to the expander tube, the tube causes the friction band to engage the inner cylinder, thereby limiting movement of the strut. In order to induce pressure to the expander tube, the expander tube is connected to a damper connected between the outer cylinder of the landing gear and the upper torsion links thereof. As the strut compresses, the piston or valve within the damper moves correspondingly and, due to a restrictive orifice in the damper, fluid pressure builds up above the piston as a function of the velocity of the strut. This pressure is then transmitted to the expander tube in the strut which in turn causes the friction band to press against the inner cylinder of the strut with a force proportional to the velocity of the strut thereby providing frictional dampening.

In addition, a second feature is provided by a pressure actuated slide valve which senses differential pressure between the right hand and left hand struts of the aircraft. If a differential pressure beyond a certain threshold exists between the two struts, the valve is displaced and hydraulic pressure is ported to the expander tube of the strut having the lowest pressure to thereby restrict extensional movement of that strut to hence maintain the aircraft level and prevent further roll.

The same feature as mentioned above is disclosed by way of an electrical sensing and circuit means.

Accordingly, a principal object of this invention is to save weight in airplanes by replacing the oil carried in the conventional oleo struts by a hydraulic analog damping device and friction expander tube means.

Another principal object of this invention is to provide an expander tube device between the inner and outer telescopic cylinders of an aircraft landing gear strut for restricting telescopic movement in the inboard strut when the airplane is taxiing in a turn.

An additional object of this invention is to provide for a device for locking all oleo struts of an aircraft landing gear having forward and aft struts when the aircraft is parked.

Other objects and advantages of the disclosed aircraft anti-roll hydraulic analog damping device will be apparent from the following detailed description taken in conjunction with the accompanying drawings.

BRIEF DESCRIPTION OF THE DRAWINGS

The drawings diagrammatically illustrate by way of example, not by way of limitation, two forms of the invention wherein like reference numerals designate corresponding parts in the several views in which:

FIG. 4 is a schematic sectional view of the analog damping device as shown mounted to the aircraft landing gear in FIG. 2.

FIG. 5 is a circuit diagram embodying an electrically controlled shock strut stabilizing system and parking brake with manual switch means incorporated therein.

DESCRIPTION OF THE INVENTION

The basic principle of operation in the present invention is achieved by an analog damping device which at a reduced ratio of displacement, in comparison with the vertical translations of a telescoping shock strut, generates a pressure which is a function of the velocity of the vertical translations, either contraction or extension, of the shock strut. The generated pressure is used via hydraulic system to cause an inner tube means to expand and evoke frictional engagement between the telescoping parts of the strut and thus control the displacement or translations thereof.

As a result, the several hundred pounds of oil which are normally used in conventional landing gear oleo struts are replaced by a system that replaces the oil with a light-weight substitute.

Figure 1:
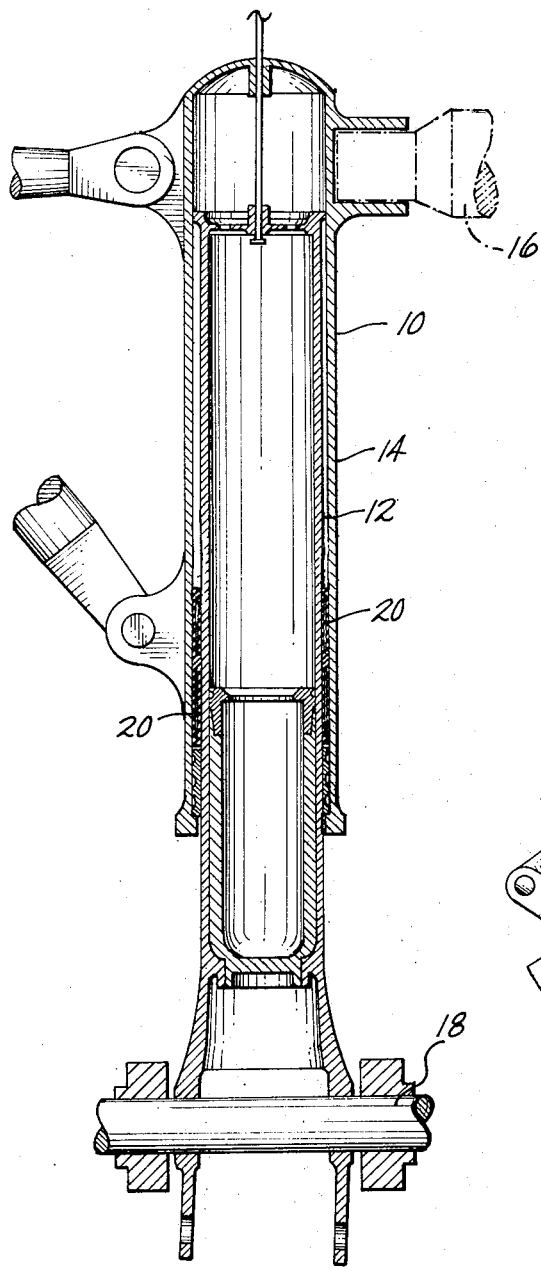
FIG. 1 is a schematic sectional front view of the aircraft shock strut when fully extended.

Referring now to FIG. 1, the shock strut 10, which replaces the prior art oleo strut, includes a telescopingly arranged inner cylinder 12 and outer cylinder 14. The strut 10 is further mounted between the aircraft landing gear trunnion 16 and the truck trunnion 18. Frictional means 20 are mounted between the inner cylinder 12 and outer cylinder 14, as illustrated further in more detail in the following drawings.

Figure 2:
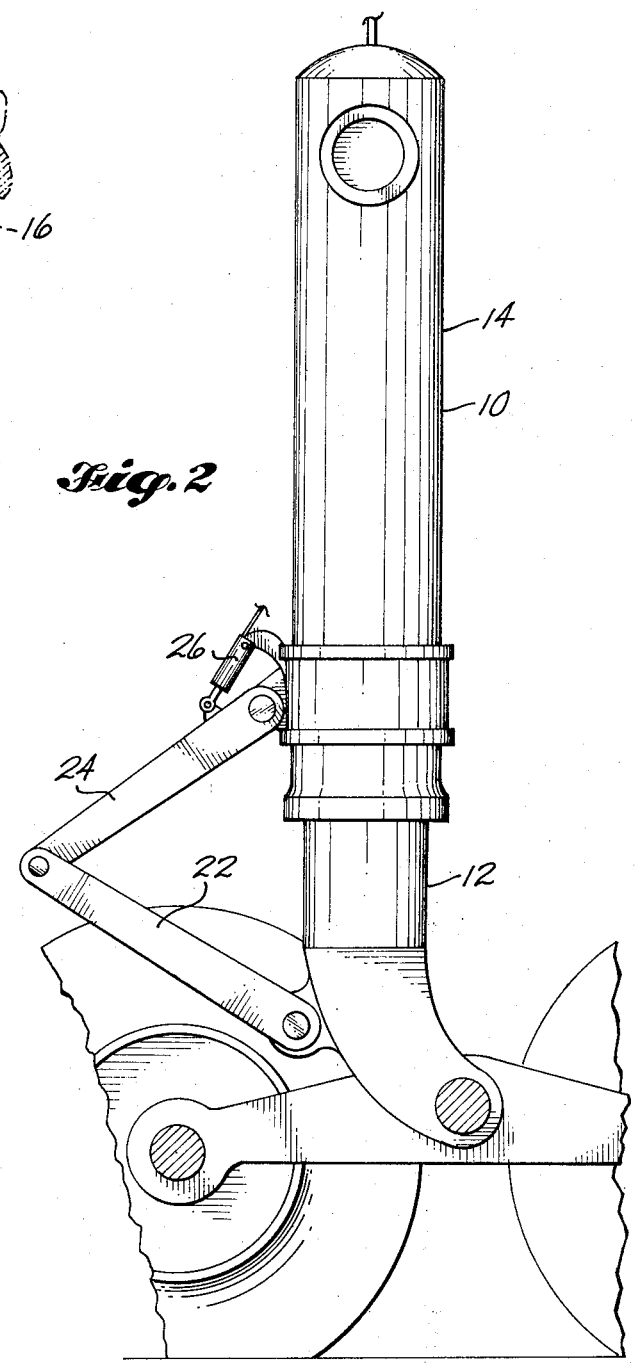
FIG. 2 is a side view of the shock strut shown in FIG. 1 and equipped with an analog damper device.
Figure 3:
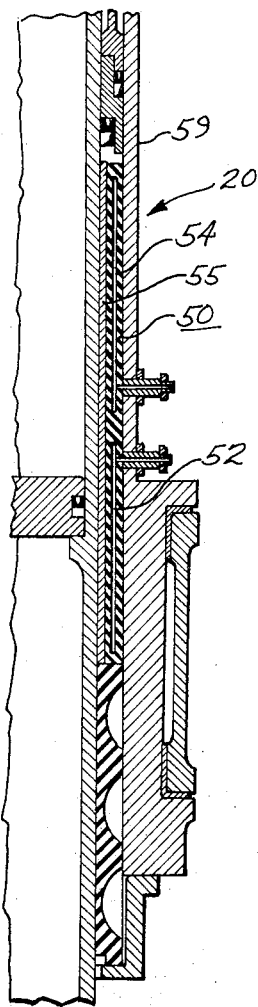
FIG. 3 is a detailed sectional view of part of the shock strut having an expander tube.

The view in FIG. 2 shows part of a landing gear truck which comprises four wheels and is used nowadays on the heavy type of aircraft, such as the 707 and 747. For explanation purposes, two of the side wheels are removed so that an unobstructed view of the lower torsion link 22 and upper torsion link 24 is obtained as well as of the analog damping device 26 and the pivotally arranged mounting of these parts with one another. As can be realized, any motion between the inner and outer cylinders 12 and 14, respectively, will transmit at a reduced scale via the torsion links 22 and 24, respectively, a motion to the damper 26. The damper 26 is shown in more detail in FIG. 4 and comprises an open cylinder 30 carrying a piston valve means 32, hereinafter referred to as piston 32. The piston 32 contains a chamber 34 which has an orifice 36 that surrounds an orifice rod 38 that extrudes internally from the open cylinder 30. The orifice rod 38 has a passageway 40 which is connected to a low pressure reservoir (not shown); however, any return line of the main hydraulic system aboard aircraft will normally be taken for this purpose. Depending on the position of the piston 32 within the open cylinder 30, a pressure chamber 41 of variable volume is created. This pressure chamber 41 is connected via interconnecting tube 42 to the frictional means 20. As shown in FIGS. 1, 3, 4 and 5, the frictional means includes various components such as a ring-shaped tube structure 50 fitting between the inner cylinder 12 and outer cylinder 14 of the strut 10. As shown, this tube 50 comprises a lower chamber 52 and an upper chamber 54. The tube is made of any type of flexible material. In order to enhance the frictional operation at the time that the tube expands, a layer of frictional material 55 is disposed between the outer cylinder 14 inner surface and the tube 50.

The lower tube chamber 52 is connected via the analog damper 26 and handles the damping of one shock strut while the upper chamber 54 handles the anti-roll and parking brake feature by sensing actions of the left and right hand struts simultaneously.

Movement of the piston 32 transmitted by the upper torsion link 24 will reduce the pressure chamber volume 41 and thus move oil through tube 42 into the tube 50 which, accordingly, will expand and thus restrict movement between the inner cylinder 12 and the outer cylinder 14 of the strut 10. It will be obvious that the volume of oil used in the analog damper and expander tube system is very small in comparison to the prior art oleo strut type systems. The orifice rod 38, as well as the orifice 36, has specifically determined measurements so that the correct damping schedule in accordance with conventional practices is provided. Furthermore, a fine orifice means 56 is mounted between the reservoir and the orifice rod 38 in the passageway 40 so that sufficient pressure is retained in the system and any lost motion is eliminated.

It should be realized that various alterations to fulfill certain requirements can be made; for instance, if a two-way rebound damping is required, the replacement of the damper 26 and orifice means 56 by a two-way damping device (not shown) would perform such a function.

Thus, the lower tube portion 52 of the expansion tube 50 has been used for providing the dampening to the shock strut of the aircraft landing gear. However, a similar damping or control to the vertical telescoping movement of the strut 10 can be achieved via the upper tube portion 54 as an anti-roll feature and as a parking brake feature.

As an anti-roll system, there are two embodiments disclosed, one being electrical and the other one of a pneumatic-mechanical nature. The electrical system is illustrated in FIG. 5 and comprises a roll sensor, being a mercury switch means 60 which senses the centrifugal forces on the airplane and is mounted horizontally in the aircraft; however, any lateral accelerometer would suffice. A mercury drop 62 within the horizontal sensor 60 will sense side force and accordingly trip the switch 64 or 65. Electrical circuit means 66 are connecting the mercury switch 60 to a solenoid valve 68 which solenoids will operate upon activation of the switch 60 and thus deliver high pressure to the upper tube portion 54 and accordingly provide for a braking or damping action in the strut 10.

Also incorporated herein is a parking brake switch 70 which can be manually controlled by the pilot and provide for the same action of braking. Thus the right or left hand dip or roll of an airplane during taxiing and especially by turning is prevented through the anti-roll sensor system while the parking brake switch activation in the disclosed system will prevent an off horizontal position of the airplane by locking all the struts for loading and unloading operations.

Figure 6:
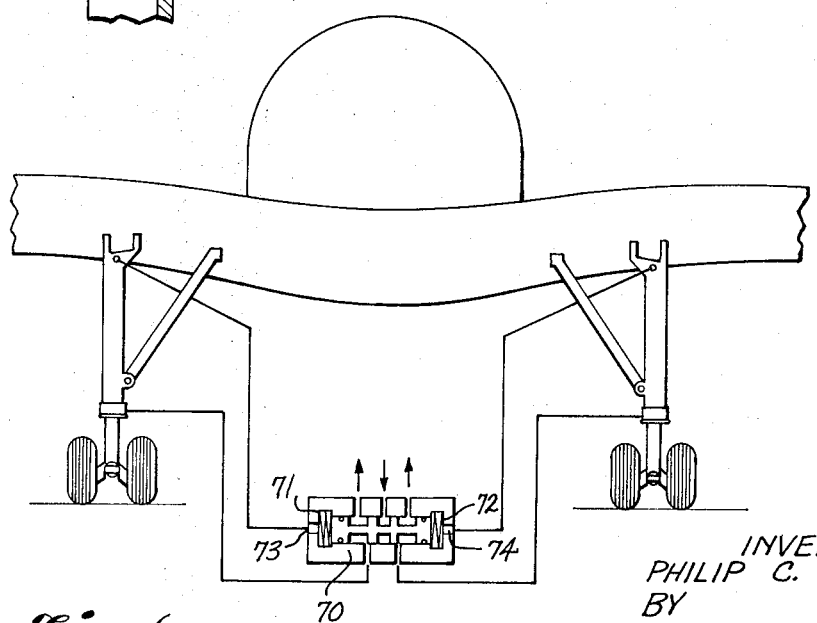
FIG. 6 is a front view of an aircraft incorporating a pneumatic mechanical system for roll control and for back-up or substitution of the electrical system shown in FIG. 5.

The second embodiment of the anti-roll feature is illustrated in FIG. 6, and here excessive roll angles are prevented by a pressure actuated valve 70 which is centered by spring cartridges 71 and 72. Pressure sensing ports 73 and 74 are connected to the right and left hand gear manifolds as illustrated.

It will be realized that if a differential pressure beyond a certain threshold exists between the two manifolds, the valve 70 is displaced and hydraulic pressure is ported to the expanded tube part 54. Accordingly, the pressure provided to the tube part 54 will provide friction against the inner cylinder of the strut gear nearest the turn center and prevent that strut from extending. Simultaneously, this will prevent a development of any further roll angle beyond that permitted by the opposite higher loaded shock strut. When the differential manifold pressures are relieved because the airplane has made the turn, then both expander tubes 54 are vented automatically to an equilibrial condition.

For comparison reasons, it could be stated that the analog damper replaces the conventional oleo strut in a scaled down fashion.

While in accordance with the patent statutes the preferred embodiments of the present invention have been illustrated and described in detail, it is to be particularly understood that the invention is not limited thereto or thereby, but that the inventive scope is defined in the appended claims.

I claim:

1. An analog damping system for damping telescoping translation of an aircraft landing gear, comprising in combination:
   a. a strut having telescopingly arranged inner and outer cylinders;
   b. linking means pivotally connected with said inner and outer cylinders for transmitting a displacement proportional to the vertical translation of said telescoping strut;
   c. analog damping means pivotally connected to said linking means for receiving said displacement and generating a responsive pressure proportional to said displacement rate, and
   d. friction generating means disposed between said inner and outer cylinders of said strut and connected to said analog damping means for receiving said generated pressure for damping and telescoping translation of said aircraft landing gear.

2. An analog damping system as claimed in claim 1 wherein said friction generating means comprises a ring-shaped tube of flexible material connected to said outer cylinder inside surface and adapted to expand when said pressure is received therein.

3. An analog damping system as claimed in claim 2 wherein a friction material is disposed on said tube inside ring surface.

4. An analog damping system as claimed in claim 3 wherein said linking means comprises in series an upper torsion link pivotally connected to said outer cylinder at one end and pivotally connected to a lower torsion link and wherein said lower torsion link is pivotally connected to said inner cylinder so that vertical translation of said strut varies said torsion link angular position with respect to said strut longitudinal axis.

5. An analog damping system as claimed in claim 4 wherein said damping means is hydraulically connected to a pressurized system and wherein said damping means comprises a cylinder-piston arrangement disposed with one another to form a chamber, said linking means pivotally mounted to said cylinder-piston arrangement for varying said chamber volume and subsequently producing said pressure for actuating said friction means to expand so that linear translation between said inner and outer cylinder is restrained.

6. Anti-roll and parking brake system for damping and braking telescoping translation of aircraft landing gears comprising:
   a. an aircraft landing system having a right-handed landing gear and a left-handed landing gear;
   b. each one of said gears provided with a telescoping shock strut including an inner and an outer cylinder disposed in a telescoping translational arrangement;
   c. friction generating means disposed between said inner and outer cylinders and provided with a first means for receiving a pressure force for generating damping and braking friction between said cylinders;
   d. aircraft roll sensing means having a first and second switching means responsive to operate respectively when a left or right centrifugal force on said aircraft is sensed, and
   e. means interconnecting said switching means and each said landing gear first means so that pressure is ported to said landing gear strut experiencing a reduced load and subsequently prevent extension thereof.

7. Anti-roll and parking brake system as claimed in claim 6 wherein said roll sensing means comprises an electrical roll sensing means and circuitry to actuate a solenoid valve in response to signals from said roll sensing means so that during turning of said aircraft, pressure is supplied to said landing gear first friction pressure receiving means positioned nearest said turning center.

8. Anti-roll and parking brake system as claimed in claim 7 having a manual switch for closing said electrical circuitry so that said left and right hand landing gear receive equal pressure via said solenoid switch means to said first frictional means so that vertical translations of said landing gear struts are prevented.

9. Anti-roll and parking brake system as claimed in claim 6 wherein said roll sensing means comprises
   a. a center spool valve means having a pair of spring center cartridges;
   b. a first and a second pressure sensing port connected from each cartridge to said right and said left landing gear strut for measuring load pressure, and
   c. means connected between said center spool and said first frictional means in each said landing gear for supplying pressure to said respective landing gear nearest a turning center when said aircraft is turning due to an unbalanced measured load pressure sensed by said sensing ports.

10. An anti-roll and parking brake system as claimed in claim 6 comprising
   a. a second means in said friction generating means for receiving pressure in each said left and right landing gear for generating damping;
   b. linking means pivotally mounted between said inner and outer cylinder of each said landing gear strut;
   c. analog damping means pivotally connected to each said linking means and interconnected with an associated pressure source and said second receiving means so that vertical telescoping movement of each said strut produces a proportional velocity and movement to said damping means for transmission and predetermined damping of said respective strut by actuation of said second pressure receiving means in said friction generating means.

* * * * *